(12) United States Patent
Baer

(10) Patent No.: US 10,685,753 B1
(45) Date of Patent: Jun. 16, 2020

(54) SYSTEMS AND METHODS FOR FAST MOLTEN SALT REACTOR FUEL-SALT PREPARATION

(71) Applicant: Metatomic, Inc., Aiken, SC (US)

(72) Inventor: Donald Ken Baer, Aiken, SC (US)

(73) Assignee: Metatomic, Inc., Aiken, SC (US)

(\*) Notice: Subject to any disclaimer, the term of this patent is extended or adjusted under 35 U.S.C. 154(b) by 0 days.

(21) Appl. No.: 16/415,668

(22) Filed: May 17, 2019

(51) Int. Cl.
| | |
|---|---|
| G21C 21/16 | (2006.01) |
| G21C 3/04 | (2006.01) |
| G21C 17/06 | (2006.01) |
| G21C 21/02 | (2006.01) |
| G21F 9/30 | (2006.01) |
| G21C 3/54 | (2006.01) |

(52) U.S. Cl.
CPC ............ *G21C 21/16* (2013.01); *G21C 3/045* (2019.01); *G21C 3/54* (2013.01); *G21C 17/06* (2013.01); *G21C 21/02* (2013.01); *G21F 9/301* (2013.01)

(58) Field of Classification Search
CPC ........ G21C 21/00; G21C 21/16; G21C 21/02; G21F 9/301
USPC ................................................. 264/0.5, 37.1
See application file for complete search history.

(56) References Cited

U.S. PATENT DOCUMENTS

| | | | |
|---|---|---|---|
| 6,251,310 B1 | 6/2001 | Song et al. | |
| 9,767,926 B2 * | 9/2017 | Schleicher | G21C 1/024 |
| 10,141,079 B2 * | 11/2018 | Czerwinski | G21G 1/08 |
| 10,280,527 B2 * | 5/2019 | Loewen | G21C 3/60 |
| 2009/0225923 A1 * | 9/2009 | Neeley | G21C 1/00 |
| | | | 376/186 |

(Continued)

FOREIGN PATENT DOCUMENTS

| | | | |
|---|---|---|---|
| GB | 803258 A | 10/1958 | |
| GB | 1171257 A | 11/1969 | |

(Continued)

OTHER PUBLICATIONS

Sakamura et al., "Conversion of Oxide into Metal or Chloride for the Pyrometallurgical Partitioning Process", Central Research Institute of Electric Power Industry, pp. 1-7.

(Continued)

*Primary Examiner* — Christina A Johnson
*Assistant Examiner* — Xue H Liu
(74) *Attorney, Agent, or Firm* — Womble Bond Dickinson (US) LLP

(57) ABSTRACT

The present disclosure provides systems and methods for fast molten salt reactor fuel-salt preparation. In one implementation, the method may comprise providing fuel assemblies having fuel pellets, removing the fuel pellets and spent fuel constituents from the fuel assemblies, granulating the removed fuel pellets or process feed to a chlorination process, processing the granular spent fuel salt into chloride salt by ultimate reduction and chlorination of the uranium and associated fuel constituents chloride salt solution, enriching the granular spent fuel salt, chlorinating the enriched granular spent fuel salt to yield molten chloride salt fuel, analyzing, adjusting, and certifying the molten chloride salt fuel for end use in a molten salt reactor, pumping the molten chloride salt fuel and cooling the molten chloride salt fuel, and milling the solidified molten chloride salt fuel to predetermined specifications.

22 Claims, 10 Drawing Sheets

(56) References Cited

U.S. PATENT DOCUMENTS

| | | | |
|---|---|---|---|
| 2009/0269261 | A1 | 10/2009 | Kim et al. |
| 2011/0286570 | A1 | 11/2011 | Farmer et al. |
| 2013/0266112 | A1 | 10/2013 | Kuran et al. |

FOREIGN PATENT DOCUMENTS

| | | |
|---|---|---|
| GB | 2536857 A | 10/2016 |
| JP | 11231091 | 10/1958 |
| KR | 20060035917 A | 4/2006 |
| KR | 20090089091 A | 8/2009 |
| KR | 20090109237 A | 10/2009 |
| KR | 20090109238 A | 10/2009 |
| KR | 20110034347 A | 4/2011 |
| WO | 2017158335 A1 | 9/2017 |

OTHER PUBLICATIONS

Spencer, "Recycling Nuclear Fuel: The French Do It, Why Cant Oui", The Heritage Foundation, Dec. 2007, pp. 1-4, retrieved Feb. 2019 from https://www.heritage.org/environment/commentary/recycling-nuclear-fuel-the-french-do-it-why-cant-oui.

Mernache et al., "Recycling pocess of defective aged uranium dioxide pellets", Journal of Nuclear Science and Technology vol. 53, No. 6, Apr. 2015, p. 1-26, retrieved Apr. 2019 from https://www.tandfonline.com/doi/full/10.1080/00223131.2015.1072483.

Kim, et al., "Engineering Design of a Voloxidizer with a Double Reactor for the Hull Separation of Spent Nuclear Fuel Rods", Science and Technology of Nuclear Installations, Dec. 2017, pp. 1-9, retrieved Apr. 2019 from https://www.hindawi.com/journals/stni/2017/9854830.

Tempest et al., "Oxidation of UO2 fuel pellets in air at 503 and 543 K studied using X-ray photoelectron spectroscopy and X-ray diffraction", Journal of Nuclear Materials, 1988, pp. 1-2, retrieved Apr. 2019 from https://www.sciencedirect.com/science/article/pii/0022311588900190.

Rondinella et al., "The high burn-up structure in nuclear fuel", MaterialsToday, vol. 13 No. 12, Dec. 2010, pp. 24-32.

"Uranium Tetrafluoride", IBILabs, pp. 1-7, Retrieved Aug. 2016 from http://ibilabs.com/uranium-uranyl-thorium-compoundsuranium-compunds/uranium-tetrafluoride.

"Uranium tetrafluoride", Wikipedia, pp. 1-8, retrieved Nov. 2017 from https://en.wikipedia.org/wiki/Uranium_tetrafluoride.

Osborne et al., "Hydrofluoric Acid Corrosion Study of High-Alloy Materials", Nuclear Science and Technology Division, Aug. 2002, pp. 1-20.

"Inconel 600", Shanghai Fengqu Superalloy Co., Ltd., pp. 1-2, retrieved Mar. 2019 from http://www.superally.com.cn/EN/Alloy/Inconel600/.

"Processing of Used Nuclear Fuel", World Nuclear Association, Jun. 2018, pp. 1-18, retrieved Feb. 2019 from http://www.world-nuclear.org/information-library/nuclear-fuel-cycle/fuel-recycling/processing-of-used-nuclear-fuel.aspx.

Alfaro et al., "Reduction Kinetics of Uranium Trioxide to Uranium Dioxide Using Hydrogen", World Journal of Nuclear Science and Technology, 2015, pp. 149-156.

Wahlquist et al., "Second Generation Experimental Equipment Design to Support Voloxidation Testing at INL", Idaho National Laboratory, May 2008.

Volkovich et al., "Effect of Melt Composition on the Reaction of Uranium Dioxide with Hydrogen Chloride in Molten Alkali Chlorides", Oct. 2007, pp. 671-677.

Choi, et al., "Economic Analysis on Direct Use of Spent Pressurized Water Reactor Fuel in Candu Reactors-I: Dupic Fuel Fabrication Cost", Nuclear Technology, vol. 134, May 2000., pp. 1-20.

Lyon et al., "The Preparation of Uranium Dioxide from a Molten Salt Solution of Uranyl Chloride," Hanford Atomic Products Operation, Richland, Washington, Oct. 20, 1959, HW-62431, 22 pages.

"Technology—Elysium Industries," <http://www.elysiumindustries.com/technology>, 2017, 6 pages.

\* cited by examiner

SYSTEMS AND METHODS FOR FAST MOLTEN SALT REACTOR FUEL-SALT PREPARATION

TECHNOLOGICAL FIELD

The present disclosure relates generally to methods and systems for processing pelletized-form light water reactor spent nuclear fuel into fluoride-based or chloride-based molten salt reactor fuel.

BACKGROUND

Nuclear fuel that has been irradiated in a nuclear reactor is generally referred to as spent nuclear fuel. Such spent nuclear fuel is generally not reused or recycled but instead is most often stored onsite in specially-design pools in the vicinity of the nuclear reactor in which such nuclear fuel was used. Aged spent nuclear fuel, having undergone significant decay so that it doesn't produce significant heat, may also be stored in dry casks on pads at the reactor site in which it was produced, at decommissioned reactor sites, and/or at other approved sites pending disposal at a permanent disposal facility.

According to the U.S. Energy Information Administration, as of 2013, there were more than 70,000 metric tons of spent nuclear fuel stored at sites within the United States (https://www.eia.gov/nuclear/spent fuel/). Such spent nuclear fuel will be lethal to humans for thousands of years, requiring its storage meet stringent requirements and close monitoring. Further, while spent nuclear fuel storage has proven to be reasonably safe to date, the risk remains that a large fire, explosion, terrorist attack, plane crash, or accident could occur that damages a spent fuel pool and/or dry cask storage of such spent fuel.

Therefore, it would be desirable to have a system, apparatus and/or method that takes into account at least some of the issues discussed above, as well as possibly other issues, and yields an improved solution.

BRIEF SUMMARY

Exemplary implementations of the present disclosure are generally directed to methods and processes involving light water power reactor spent nuclear pellet-form fuel, extracted from fuel assemblies, or, rods containing such spent nuclear pellet-form fuel, separating fuel rod cladding from the pellets, retaining substantially all spent fuel pellets and fragments thereof, and processing to halide salt powder suitable for use, perhaps with enrichment, to fuel for a molten salt reactor.

Exemplary implementations of the present disclosure are generally directed to methods and systems resulting in a substantially complete automated process for making new fuel for a molten salt reactor and which, consequently, reduce the inventory of spent fuel at commercial power reactor sites. In certain of such implementations, virtually none of the contents of the spent fuel are removed, virtually all of the spent fuel and contents are converted to molten salt fuel, and essentially all reprocessed/reprocessed fuel will be capable of generating power, substantially without the generation of additional waste, resulting in what could potentially be near-continuous reduction of currently-stored spent fuel inventory over time, with the consequent volumetric reduction of highly radioactive waste to stable or low-level forms.

In exemplary implementations of the present disclosure, processes are discussed for converting uranium oxides and plutonium oxides (as used) to uranium and plutonium chlorides.

Implementations of the present disclosure are generally directed to methods and systems for preparation of a fluoride-based salt fuel for a thermal molten salt reactor (TMSR).

Further implementations of the present disclosure are generally directed to methods and systems for preparation of a chloride-based salt fuel for a fast molten salt reactor (FMSR).

Implementations of the present disclosure are generally directed to methods and systems for retaining essentially all fuel materials in a spent fuel recycling process to substantially fully close the nuclear fuel cycle, thereby virtually eliminating a nuclear waste stream of rejected material. Highly radioactive fission waste and trans-uranium elements, e.g., Actinides in the spent fuel are retained in the process and new fuel product.

Implementations of the present disclosure are generally directed to methods and systems for allowing fission waste products and actinides in spent nuclear fuel to be burned to stable forms and incorporate salt fuel for enrichment in order to overcome the negative power effects of the fission product waste.

Certain implementations of the present disclosure are generally directed to methods and systems for reducing spent nuclear fuel and constituents to fluoride fuel salt, including calculated enrichment (U235 or Pu239). Uranium or plutonium is added to the spent fuel before or during fluoridation. The final product is a dry fuel salt powder.

Other implementations of the present disclosure are generally directed to methods and systems for producing chloride fuel salt by molten chloride reduction of spent nuclear fuel and constituents, including calculated enrichment (U235 or Pu239). Uranium or plutonium is added during chlorination. The final product is a dry fuel salt powder. In a variation of this implementation, molten salt fuel product may be poured into canisters, stored, and later inductively heated to liquid and used in the molten salt reactor.

Implementations of the present disclosure are generally directed to methods and systems that avoid chemical separation of spent fuel constituents into separate streams (which would generally result in more storage of highly radioactive waste) or additional chemical processes to rejoin spent fuel groups.

According to one example implementation, a facility and process design of the present disclosure allows operators to process spent nuclear fuel stored at nuclear power plants. The process, once put into practice, essentially closes the nuclear fuel cycle, by reducing the amount of nuclear spent fuel stored at plant sites, and molten salt reactor fuel produced in accordance with this disclosure is intended to be used in advanced molten salt reactors to ultimately generate electricity, hot water, etc. According to another exemplary implementation, a process facility is provided that is a hardened, secure, limited-access facility, configured to accept and contain highly radioactive material spent nuclear fuel, and specifically designed to house apparatus machinery and attendant support systems for continuous spent fuel processes, including spent fuel container ingress and processing spent fuel to a final packaged product, and egress of such final product. This includes shielding against radiation, remote robotic operations and safe handling, and the exclusion of personnel from processing area.

In another example implementation, a facility for conducting a process of the present disclosure is located on site within a secured perimeter, together with a spent nuclear fuel storage facility and a molten salt reactor.

According to a further exemplary implementation of the present disclosure, processes are disclosed capable of utilizing virtually all water-reactor ceramic spent nuclear fuel consisting of uranium oxide, lanthanide series elements, fission product metals and non-metals, actinide series elements, i.e., substantially all of the material found in spent nuclear fuel, for the production of halide salt fuel. These processes avoid "wet" chemical separation, since element (nuclide) constituents are not chemically separated. Production of fluoride salt is by a dry process, whereas, the process for the production of chloride salt is a liquid emersion conversion to salt. There are effectively no left-over waste products or waste streams.

According to one further exemplary implementation of the present disclosure, fuel assemblies containing an array of fuel tubes are aligned horizontally on a rod puller disassembly table, and spent fuel pellets are removed from tubes, or, "pins," by laser slitting of the fuel tubes, opening the tubes, and mechanically removing any spent fuel pellets and fragments that remain adhered to tubes. Cleaned fuel tubes, channels, and assembly end pieces (non-fuel), are set aside for recycling.

According to one further exemplary implementation of the present disclosure, spent fuel pellets and fuel pieces are processed for a specific molten salt reactor type, i.e., fluorinated salt for a "thermal" reactor and chlorinated salt for a "fast" reactor. Specifically, fuel for a thermal molten salt reactor is processed to a fluoride salt by ultimate reduction and fluorination of uranium and its associated fuel constituents, and fuel for a fast molten salt reactor is processed to a chloride salt by ultimate reduction and chlorination of uranium and its associated fuel constituents.

According to one further exemplary implementation of the present disclosure, spent fuel pellet removal from fuel pins is performed in a closed atmosphere to prevent release of dust and to capture gases back into the process. In such implementations, fuel for a molten salt reactor proceeds to one of two parallel path, specifically: (a) a path wherein at least one rotating calciner is used in a fuel fluorination preparation process, which receives extracted spent fuel pellets directly ("Option A"), or (b) a path wherein chlorinated fuel preparation spent fuel pellets are ball-milled in an enclosed atmosphere to collect dust and gases, which are recycled back into the process, and spent fuel pellets are milled to coarse granular feed to the molten salt uranium/plutonium oxide reduction tank ("Option B").

According to a further exemplary implementation of the present disclosure, spent fuel pellets undergoing Option A, i.e., the fluorination process, may be enriched by adding U235 powder to the spent fuel before fluorination, to predetermined specifications, to provide sufficient fissionable material in the final product. This enrichment could be low enriched uranium including high assay-low enriched uranium (e.g., HA-LEU, <20% enrichment). In one implementation, spent fuel and constituents are reduced to fluoride salt powder in a rotary calciner, and the powder may be enriched as necessary with fluorinated uranium-235 or plutonium-239 in order to support molten salt reactor operation.

According to yet a further exemplary implementation of the present disclosure, spent fuel undergoing Option B, a chlorination process, may be enriched with U235 or Pu239 powder added to spent fuel salt at a uranium/plutonium oxide reduction tank, to the desired specifications, to thereby provide enough fissionable material in the final product. This enrichment could be low enriched uranium including high assay-low enriched uranium (e.g., HA-LEU, <20% enrichment) or plutonium, or mixed oxide (MOX) fuel. In one implementation, spent fuel and constituents are reduced to chloride salt fuel by immersion in a molten chloride salt bath. Molten chloride fuel salt may then be enriched, in the event initial and subsequent enrichments will be required, with uranium-235, plutonium-239, or MOX (uranium and plutonium), added to the oxide reduction tanks, in order to support molten salt reactor operation.

Proper sizing of tanks and equipment, including, without limitation, multiple oxide reduction tanks being in parallel, and multiple mixing and adjustment tanks being in parallel, allows for enrichment and chemical analysis, and required tank separation and reactivity monitoring. Proper sizing ensures ample volume for mole-fraction concentration specifications. Mixing tanks provide for sampling, adjustment, and content certification. Separation, and partitioning of both sets of tanks, a first group (oxide reduction tanks) and a second group (mixing and adjustment tanks), ensures sub-criticality during the entire process. Molten chloride salt fuel is solidified and milled to powder in the process. Additional chemical processes, such as fluidized beds or small chemical reactors, may be employed to process fuel dust or volatile constituents to stable form and to subsequently rejoin spent fuel process streams. Final-product molten salt fuels are provided in powder form, sample-tested, and certified.

According to a further exemplary implementation of the present disclosure, in the case of chlorinated molten salt, initial calculations determine how much granulated spent fuel will be added to each oxide reduction tank of molten alkali or alkali earth chloride by mass and concentration of free chloride. The number and size of molten chloride reaction tanks necessary for continuous process operation to produce chlorinated salt-fuel will be determined, in part, by the rate of spent fuel pellet production and milling, spent fuel chlorination to salt, and safety considerations.

According to a further exemplary implementation of the present disclosure, spent fuel gases evolved during the Option A fluorination and Option B chlorination processes, are collected by a fluidized bed, converted to fluorinated and chlorinated fuel salts, respectively, and returned to their separate fuel salts.

According to yet another exemplary implementation of the present disclosure, chlorinated fuel salt is pumped from at least one reacting tank, by its own pump when it and its discharge isolation valve are selected. Fuel salt is pumped to a common header, with a selector valve for each to admit fuel salt to at least one cooling tray. Piping and valves from reacting tanks to cooling trays are maintained above salt melt temperature by redundant and remotely replaceable heating element jackets, to prevent salt fuel solidification.

According to a still further exemplary implementation of the present disclosure, chlorinated fuel salt in the molten state is introduced into cooling trays, cooled by chilled water, designed with multiple parallel, but separate rows, each surrounded by cooling coils to remove heat from the molten salt and cause it to solidify. The cooling trays are in a stacked array, with adequate space between trays for addition of molten salt and removal of solidified. Actual configuration and groupings of a number of trays into one array, depends on the: (a) movement of ganged-arrays; (b) tray loading from the pump-out of the mixing and adjustment tanks; (c) stacked array movement to cooling stations; (d) stacked array movement to the ball mill feed table (not shown); (e) solidified salt fuel removal and deposit on the ball mill feed table; and (f) salt fuel milling.

According to a yet further exemplary implementation of the present disclosure, solidified and cooled chlorinated fuel salt bars, or "sticks," are removed from their molds, after solidification. These sticks are collected and fed to a ball mill and fine mill, which is enclosed to retain process dust, for processing to powder, and milled to specifications. The number of cooling trays will be sufficient to support continuous feed to the milling operation and chlorinated fuel salt powder system demand.

According to a yet another exemplary implementation of the present disclosure, fuel salt product from Option A, is collected from the calciner and milled to powder product specifications, and fuel salt product from Option B is collected from fuel salt mold, ball-milled, and further milled to a fine powder. An alternate implementation of Option B method provides certified fuel salt directly to individual storage canisters, which are inductively heated to liquid for use in a molten salt reactor.

According to a yet another exemplary implementation of the present disclosure, end products of the fluorination process (Option A), and end products of the chlorination process (Option B) include their respective salt fuels and are milled to specifications and then collected in containers on carts, sealed, and transported by cart for direct use or storage. Container geometry and amount of salt fuel product are sized to prevent criticality in stored arrays. Fission product nuclides and other neutron absorbing barriers help assure adequate margin to criticality in all potential concentrations.

Another exemplary implementation of the present disclosure in the production of fuel for a thermal molten salt reactor by: providing spent fuel pellets; processing the spent fuel pellets and fuel pieces into a fluoride fuel salt by ultimate oxidation, reduction, and fluorination of uranium and its associated fuel constituents in a generally continuous progression, wherein the processing produces water vapor; and filtering, condensing, and removing the water vapor produced during the reduction and fluorination operations.

Another exemplary implementation of the present disclosure provides a method for producing fuel for a thermal molten salt reactor including: (a) providing fuel assemblies containing an array of fuel tubes aligned horizontally on a rod puller disassembly table and removing fuel pellets from the tubes; (b) processing the spent fuel pellets and fuel pieces into a fluoride salt by ultimate oxidation, reduction, and fluorination of uranium and its associated fuel constituents; and (c) filtering (including condensing and removing) the water vapor formed during the reduction and fluorination operations. In an additional exemplary implementation, the method could further include enriching the granular spent fuel salt with U235, and if further desired, fluorinating the U235-enriched granular spent fuel salt or plutonium in a calciner rotary kiln or fluidized bed.

In some exemplary implementations, a method for producing fuel for a fast molten salt reactor is provided which includes providing fuel assemblies removing fuel pellets containing uranium from the fuel assemblies and granulating the fuel pellets into granular spent fuel salt for processing feed in a semi-voided atmosphere using a ball mill, roller mill, or chopping mill, and processing the granular spent fuel salt into chloride salt by ultimate reduction and chlorination of the uranium and associated fuel constituents of the uranium. The method further includes enriching the granular spent fuel salt with U235, Pu239, or MOX, chlorinating the enriched granular spent fuel salt to yield molten chloride salt fuel using anhydrous HCl and halide salt reduction, and then analyzing, adjusting, and certifying the molten chloride salt fuel for end use in a molten salt reactor. Additionally, the method includes pumping the molten chloride salt fuel to stacked arrays of cooling trays or canisters and cooling the molten chloride salt fuel to yield solid salt fuel bars, sticks, or canister solid forms and milling the solidified molten chloride salt fuel to predetermined specifications for the fast molten salt reactor.

A method for producing fuel for a fast molten salt reactor, the method including providing fuel assemblies and removing fuel pellets containing uranium and all spent fuel constituents, from the fuel assemblies and granulating the fuel pellets in a semi-voided atmosphere using a ball mill, roller mill, or chopping mill, for process feed to the chlorination process. The granular spent fuel salt is processed into chloride salt by ultimate reduction and chlorination of the uranium and associated fuel constituents chloride salt solution. Reduction may occur using a strong reducing agent, preferably a chloride-containing reducing agent, such as anhydrous hydrogen chloride (AHCl). The granular spent fuel salt is enriched with U235, Pu239, or MOX, and the enriched granular spent fuel salt is chlorinated to yield molten chloride salt fuel using AHCl halide salt reduction. The molten chloride salt fuel is analyzed, adjusted, and certified for end use in a molten salt reactor. This implementation also includes pumping the molten chloride salt fuel to stacked arrays of cooling trays or canisters and cooling the molten chloride salt fuel to yield solid salt fuel bars, sticks, or canister solid form, and milling the solidified molten chloride salt fuel to predetermined specifications for the fast molten salt reactor.

Non-limiting example approximate temperatures, times, gas concentrations, materials used to construct the apparatus, and other parameters which are expected to be used are shown in the drawings.

More specifically, implementations of the present contemplate a full-size facility enclosing the methods and processes for processing commercial light water reactor spent nuclear fuel to final product fuel salt product for a molten salt power reactor. Equipment and machinery in the facility receive spent fuel assemblies and deliver them to a rod pulling table, and disassemble them from their support elements, namely, into separated, individual cladding fuel rods containing raw spent fuel. The fuel rods are slit and/or sliced axially along substantially their entire length by laser. Care is taken to prevent the laser from cutting through the spent fuel, burning, or fusing pellets. In one implementation, the laser simultaneously cuts opposite sides of each rod into semi-cylindrical halves, thereby exposing fuel pellets when the two halves of the fuel rod are separated. Prior to the fuel rod cladding sections being removed from the process, mechanical brushes sweep the inside surfaces of such sections lengthwise in order to recover all of the spent fuel pellets and pieces thereof, given such fuel pellets and pieces may exhibit various forms, from being generally intact, i.e., cylindrical, to broken and deformed shapes, indicated by previous cycles of operating history and subsequent handling. Gaseous constituents of the spent fuel are collected during disassembly and the conversion processes discussed herein and are processed within a fluidized bed into halides for recovery.

The features, functions and advantages discussed herein may be achieved independently in various exemplary implementations or may be combined in yet other exemplary implementations further details of which may be seen with reference to the following description and drawings.

BRIEF DESCRIPTION OF THE DRAWINGS

Figure 1:
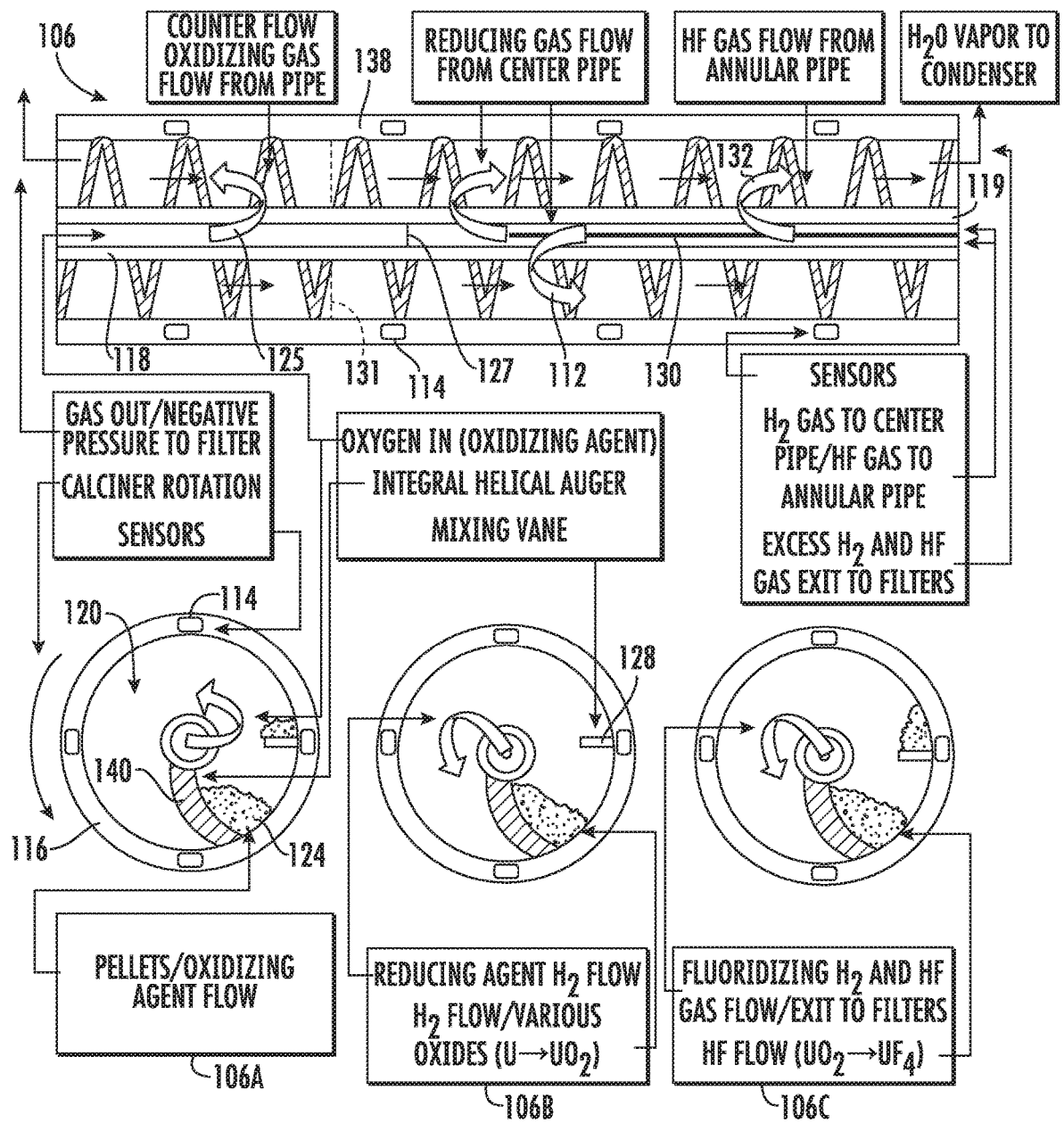
Figure 2:
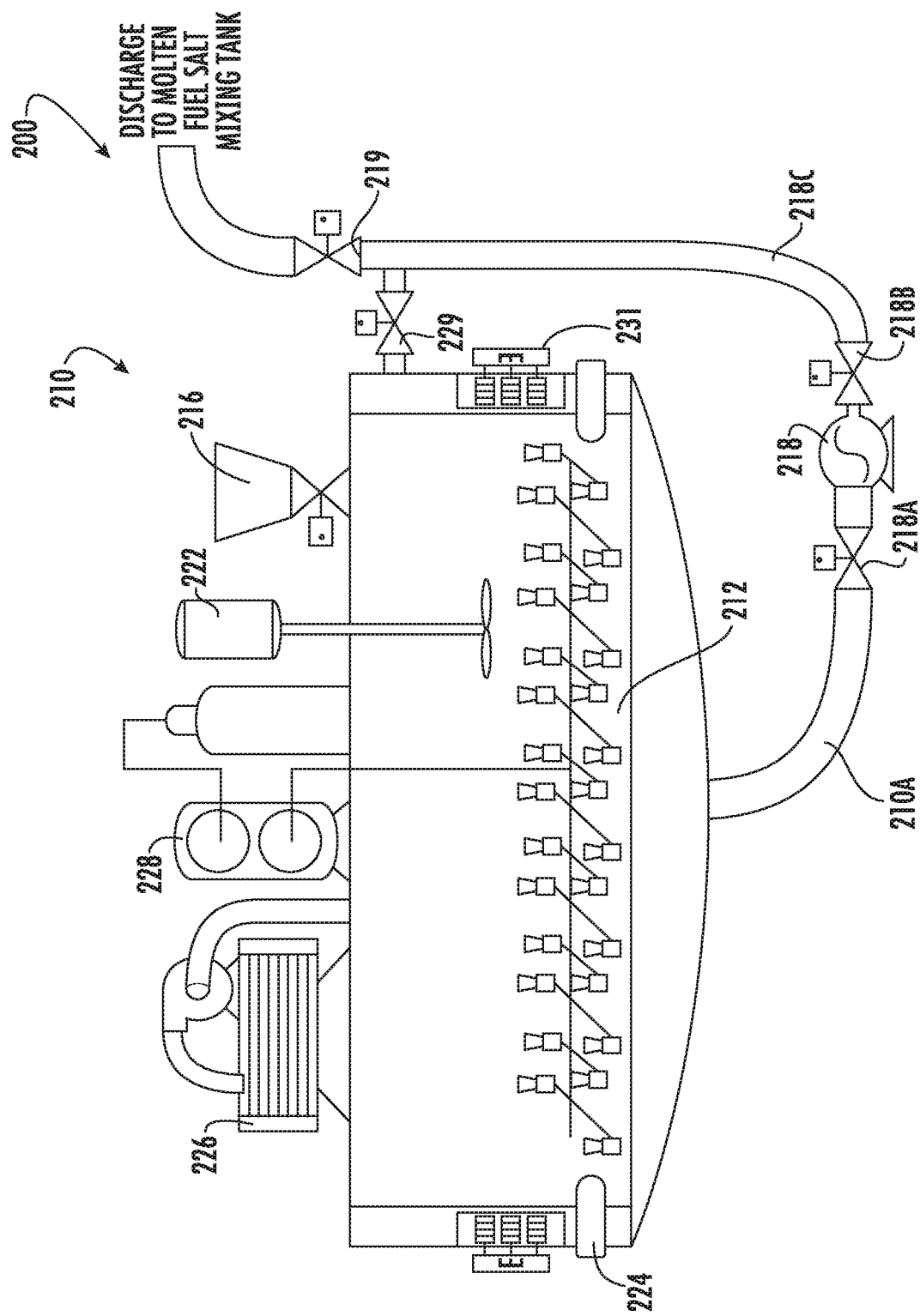
Figure 3:
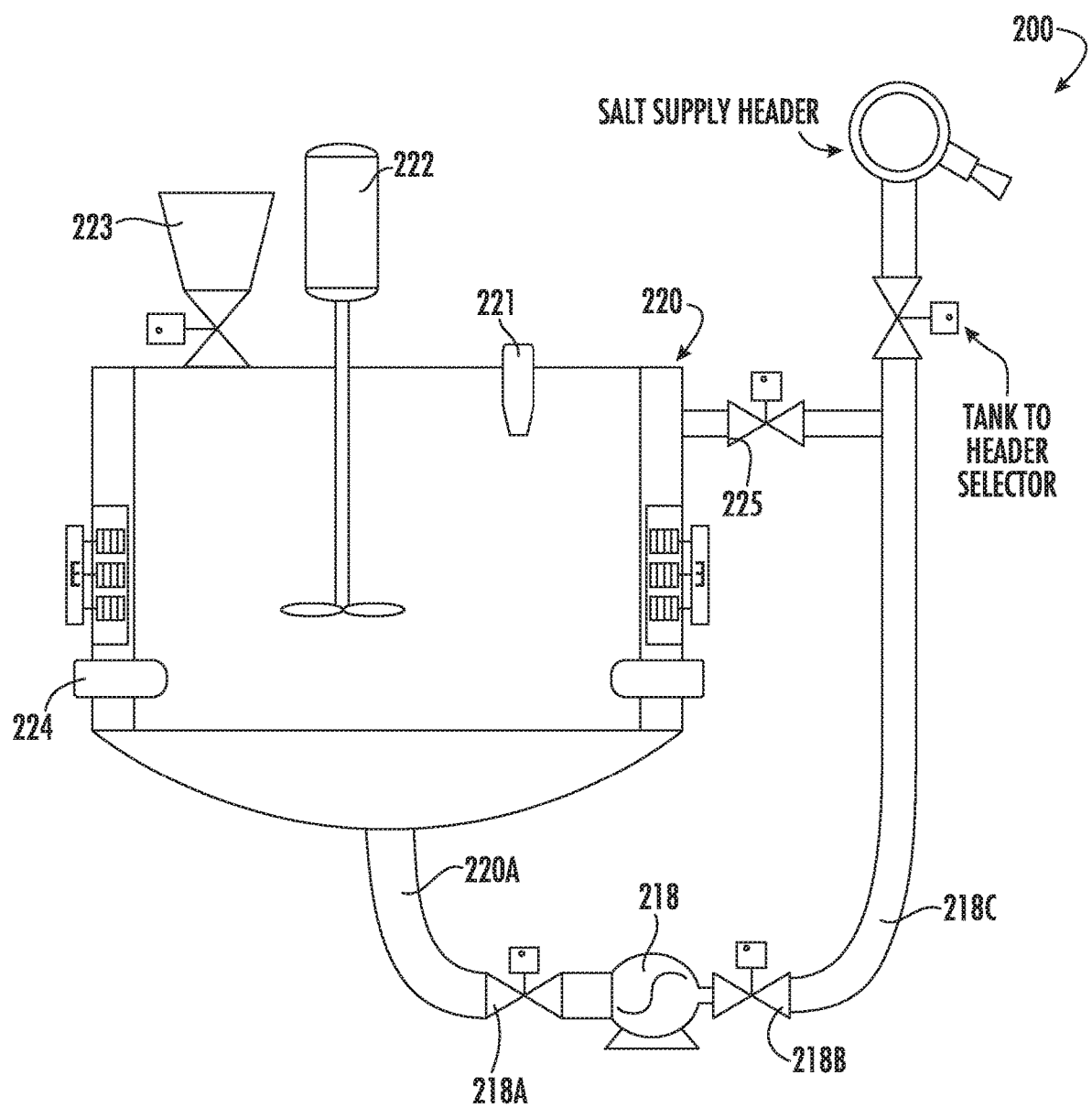
Figure 4:
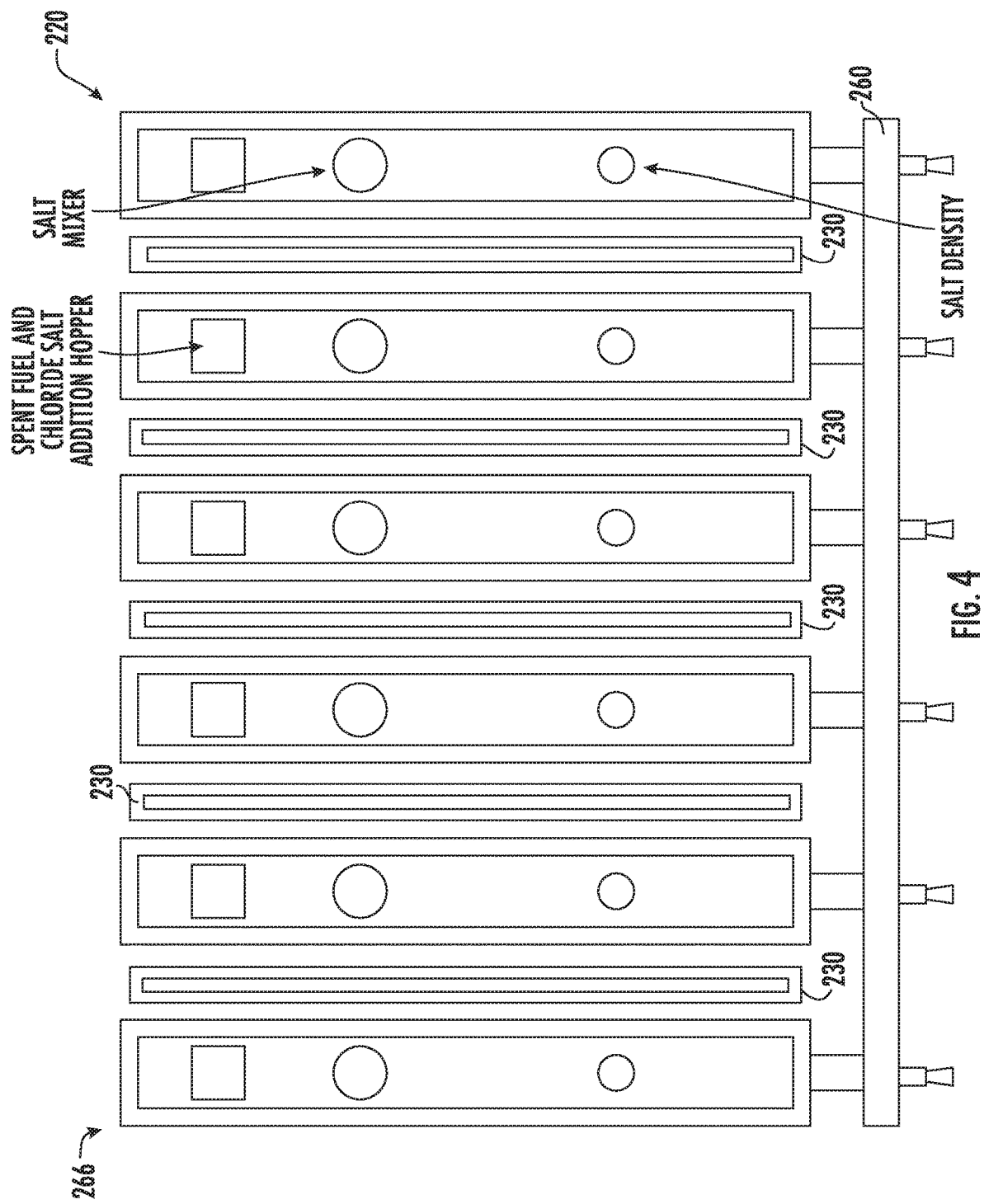
Figure 5:
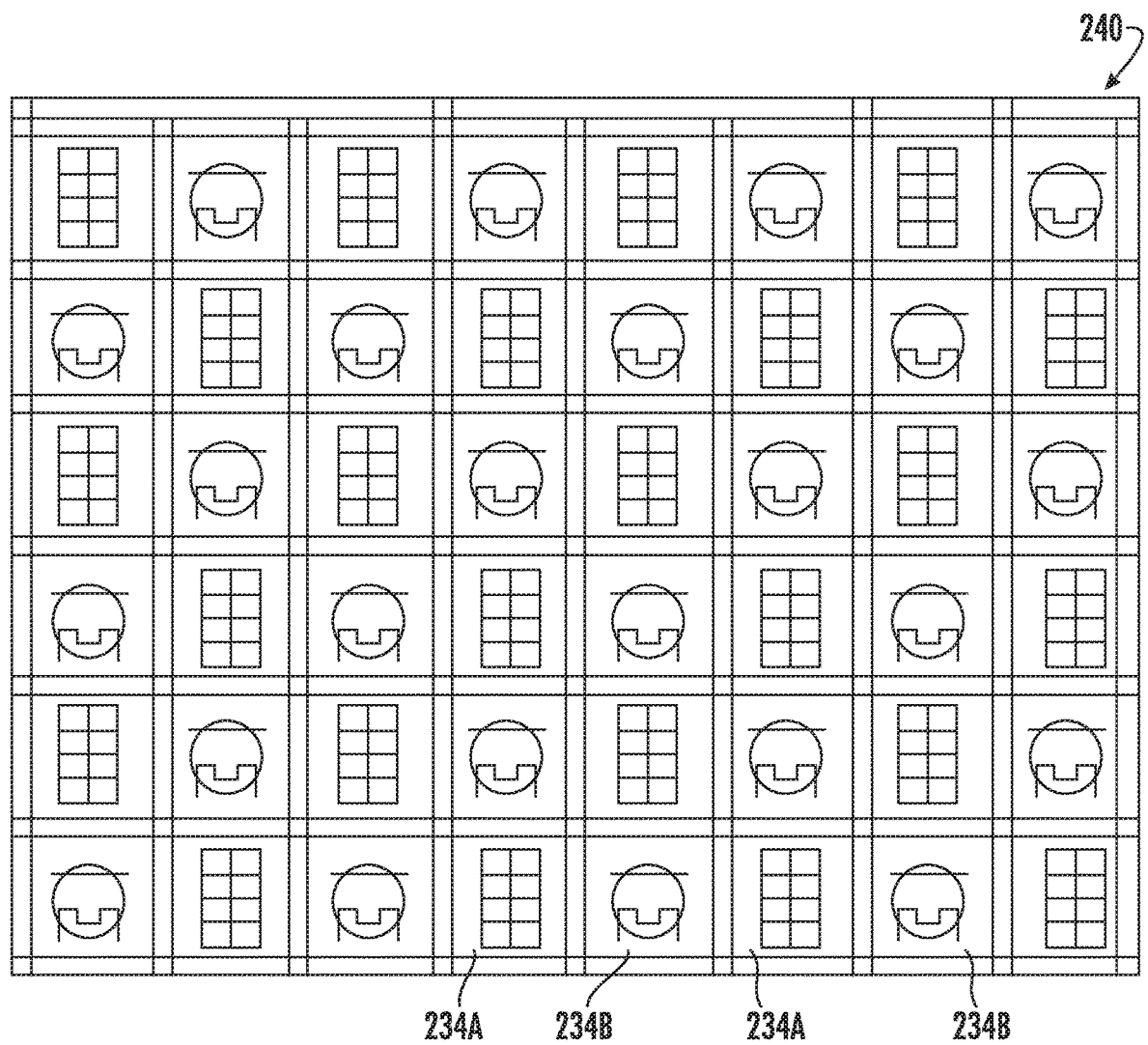
Figure 6:
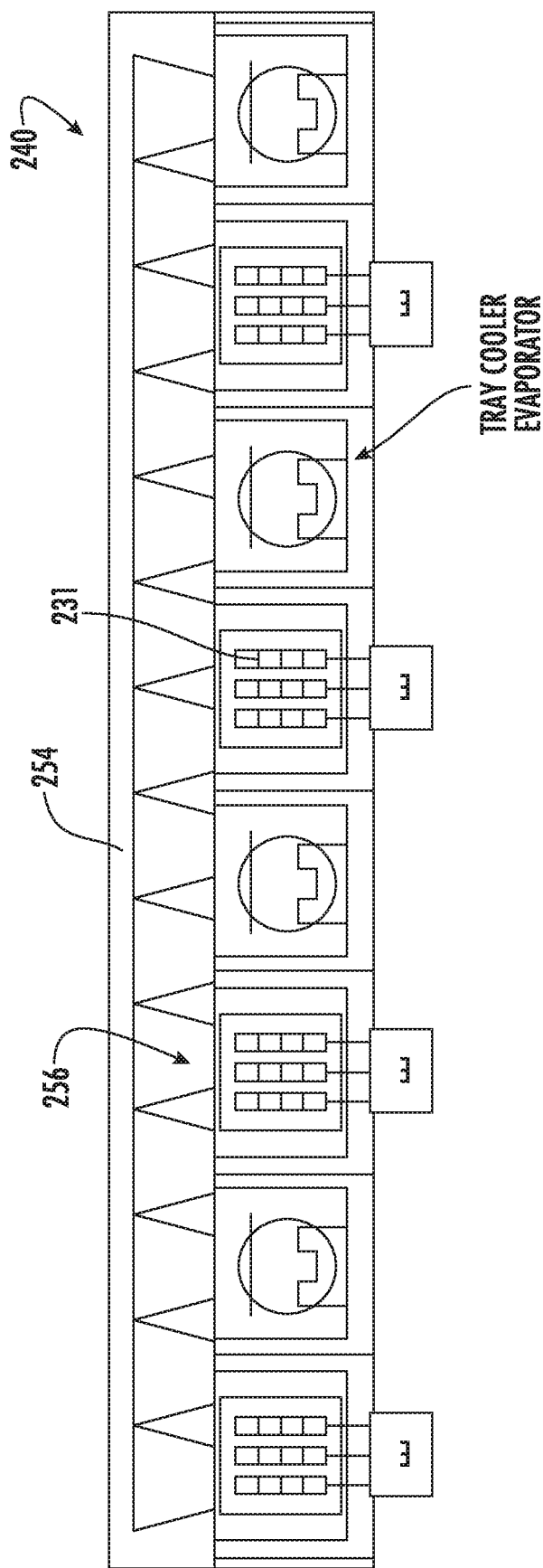
Figure 7:
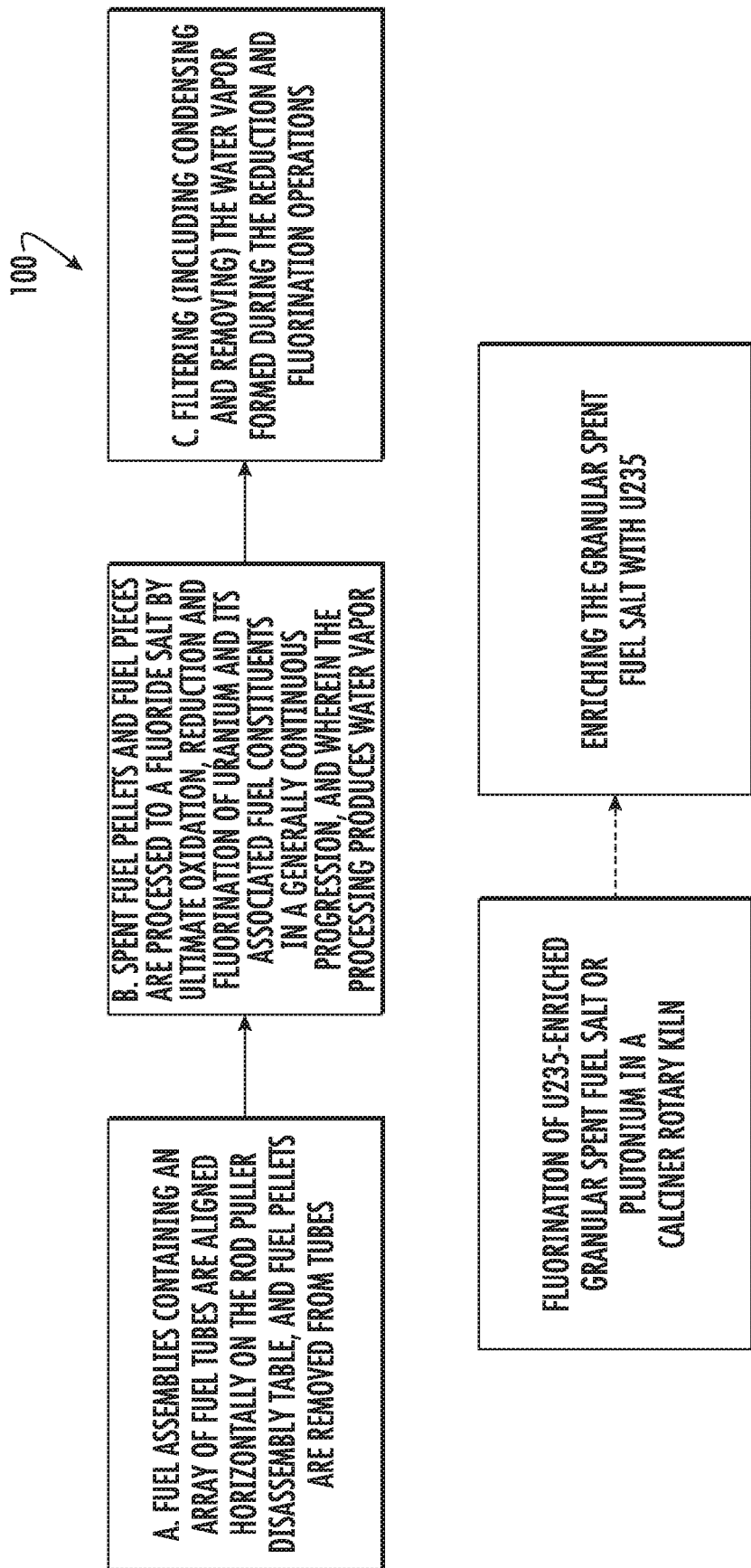
Figure 8:
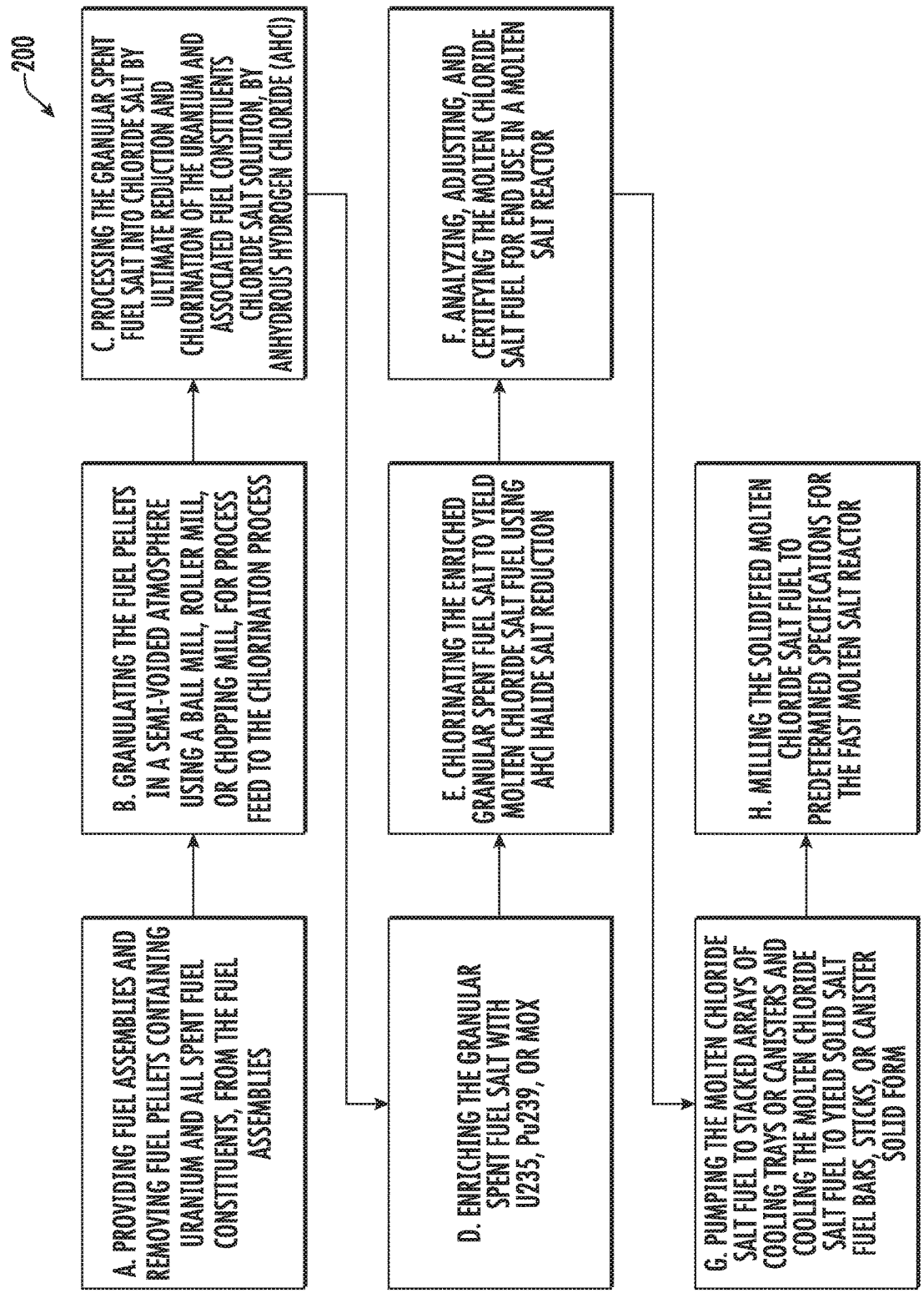
Figure 9:
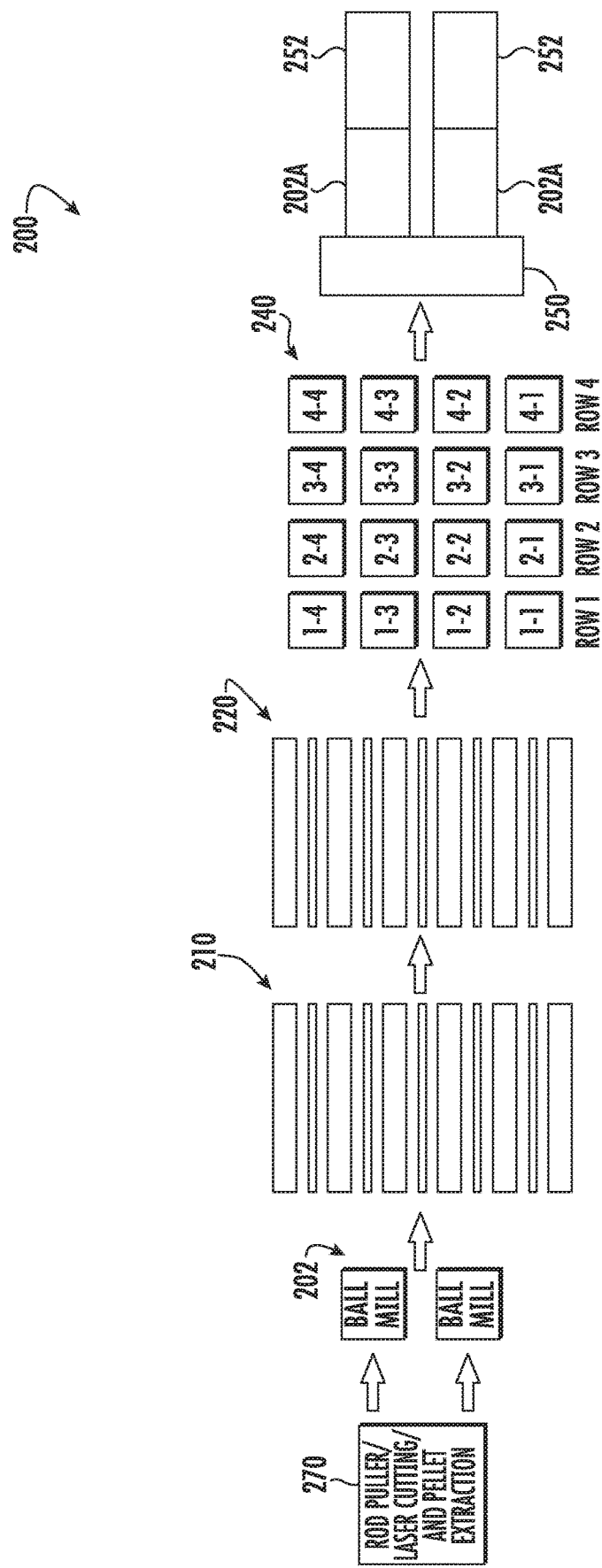
Figure 10:
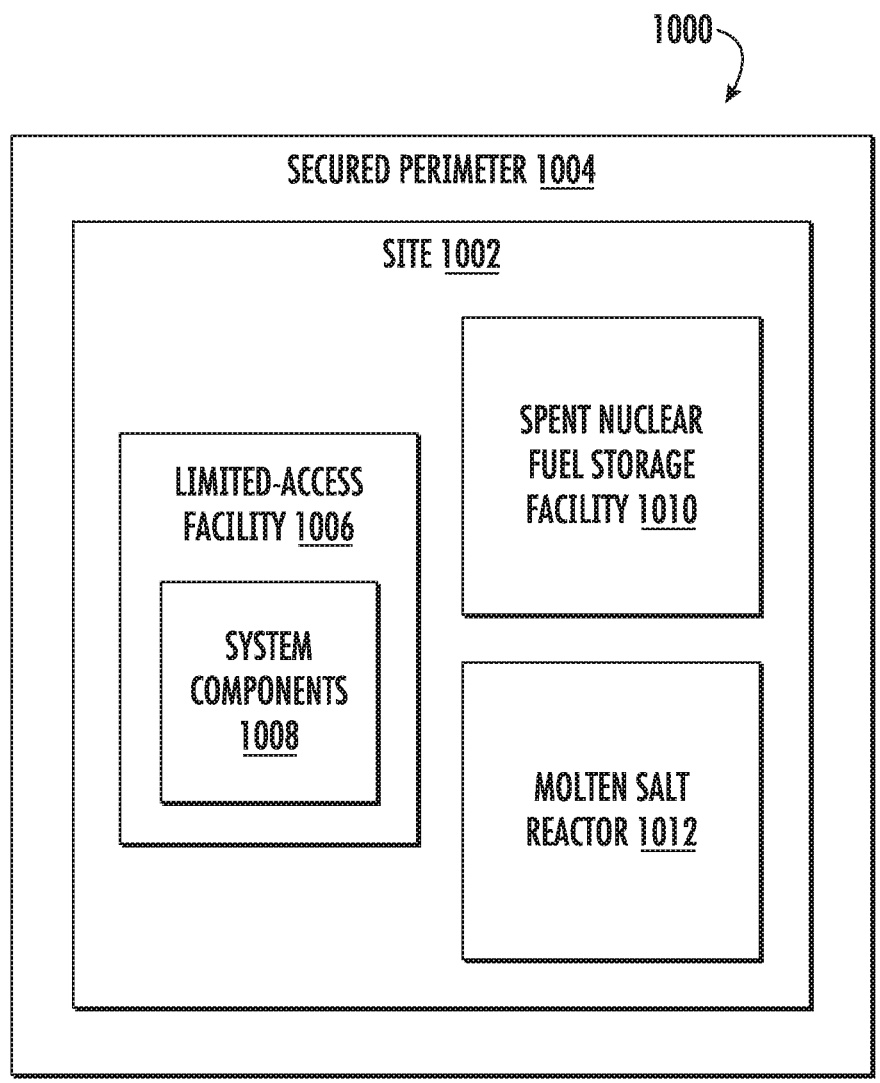

Having thus described exemplary implementations of the disclosure in general terms, reference will now be made to the accompanying drawings, which are not necessarily drawn to scale, and wherein: FIG. 1 schematically illustrates methods and systems according to exemplary implementations of the present disclosure for use in processing spent nuclear fuel into molten salt reactor fuel, and more specifically, a fluoride-based salt fuel for a thermal molten salt reactor (TMSR);

FIG. 2 schematically illustrates methods and systems according to an exemplary implementation of the present disclosure for use of a molten salt preparation in processing spent nuclear fuel into chloride fuel salt, and more specifically, the receiving of pellet-form spent fuel, which has been milled to pulverized-granulated form and uranium/plutonium oxide reduction tank, wherein the purpose is to remove oxygen and prevent production of other oxides, results in the removal of oxygen as water and conversion of generated hydrogen to water, obviating the need for using costly catalysts or chemicals not readily available, and upon oxygen and hydrogen being removed from the fuel salt, substantially the only byproduct is water;

FIG. 3 schematically illustrates the mixing and adjustment tank, illustrates methods and systems according to exemplary implementations of the present disclosure for use of a molten salt sampling, adjustment, and certification, in processing spent nuclear fuel into chloride fuel salt;

FIG. 4 schematically illustrates in plan view an exemplary methods and implementations of the present disclosure for use of a molten salt preparation in processing spent nuclear fuel into chloride fuel salt, and more specifically, typical separation for operation and critical-safe parallel arrangements of molten salt spent fuel oxide reduction and mixing tanks, including oxide reduction tanks and mixing and adjustment tanks and their relative orientation and physical separation, and physical separation by neutron absorbing panels to ensure subcriticality between parallel arrangements of oxide reduction tanks, and the same neutron absorbing panels between parallel arrangements of mixing tanks to ensure subcriticality, and including an oxide reduction tank discharge header discharges to the mixing and adjustment tank without using nozzles;

FIG. 5 schematically illustrates methods and systems according to exemplary implementations of the present disclosure for use of a molten salt preparation in processing spent nuclear fuel into chloride fuel salt, and more specifically, salt mold cooling trays;

FIG. 6 schematically illustrates methods and systems according to exemplary implementations of the present disclosure for use of a molten salt preparation in processing spent nuclear fuel into chloride fuel salt, and more specifically, a salt mold cooling tray, including a top cover, cooling molds, and heating and cooling coils;

FIG. 7 schematically illustrates a method and system according to an exemplary implementation of the present disclosure, including, a process for thermal molten salt reactor (TMSR) fuel-salt preparation;

FIG. 8 schematically illustrates a method and system according to an exemplary implementation of the present disclosure, including, a process for fast molten salt reactor (FMSR) fuel-salt preparation;

FIG. 9 schematically illustrates methods and systems according to an exemplary implementation of the present disclosure for use of a molten salt preparation in processing spent nuclear fuel into chloride fuel salt; and FIG. 10 schematically illustrates a site on which components of a system according to an example implementation of the present disclosure may be located.

DETAILED DESCRIPTION

Some implementations of the present disclosure will now be described more fully hereinafter with reference to the accompanying drawings, in which some, but not all variations of the disclosure are shown. Indeed, variations of the disclosure may be embodied in many different forms and should not be construed as limited to the examples set forth herein; rather, these are provided so that this disclosure will be thorough and complete and will fully convey the scope of the disclosure to those skilled in the art.

As used herein, "and/or" means any one or more of the items in the list joined by "and/or." As an example, "x and/or" means an element of the three-element set, e.g., [(x), (y), (x, y)]. Additionally, as used herein, the terms "exemplary" and "example" mean in context as serving as a non-limiting example, instance, illustration, or circumstance. Moreover, as used herein, the term "for example," or, "e.g.," introduces a list of one or more non-limiting examples, instances, illustrations, or circumstances.

Exemplary implementations in accordance with the present disclosure are described with reference to systems and/or methods, such as in the context of processing spent nuclear fuel. Further, for example, reference is made herein to values of or relationships between components, parameters, properties, variables or the like. These and other similar values or relationships are absolute or approximate to account for variations that may occur, such as those due to engineering tolerances or the like. Like reference numerals refer to like elements throughout.

Of note, the disclosures set forth in *Conversion of Oxide to Metal or Chloride*, by Sakamura, et al., Organization Central Research Institute of the Electric Power Industry (CRIEPI), Japan, and *Effect of Melt Composition on the Reaction of Uranium Dioxide with Hydrogen Chloride in Molten Alkali Chlorides*, by Volkovich, et al., Ural State Technical University, Russia and the entirety of both of the foregoing documents are incorporated herein by reference.

Further incorporated by reference in their entirety are the following documents: *Processing of Used Nuclear Fuel*, World Nuclear Association, (updated June 2018), https://world-nuclear.org/information-library/nuclear-fuel-cycle/fuel-recycling/processing-of-used-nuclear-fuel.aspx); *Recycling Nuclear Fuel: The French Do It, Why Can't Oui?*, Dec. 28, 2007, The Heritage Foundation (https://www.heritage.org/environment/commentary/recycling-nuclear-fuel-the-french-do-it-why-cant-oui; *Recycling Process of Defective Aged Uranium Dioxide Pellets*, Fatah Mernache, et al, published online Aug. 12, 2015, Journal of Nuclear Science and Technology, Vol 53, Issue 6; Engineering Design of a Voloxidizer with a Double Reactor for the Hull Separation of Spent Nuclear Fuel Rods, Young-Hwan Kim, et al Korea Atomic Energy Research Institute, Science and Technology of Nuclear Installations, Vol 2017, Article ID 985; *Oxidation of UO2 Fuel Pellets in Air At 503 and 543 K Studied Using X Ray Photoelectron Spectroscopy and X Ray Diffraction*, P. A. Tempest et al, Journal of Nuclear Materials February 1988; *The High Burnup Structure in Nuclear Fuel*, Vincenzo V. Rondinella et al, European Commission, Joint Research Centre, Institute for Transuranium Elements Germany, Materials Today, December 2010, Vol 13, No 12; *Uranium Tetrafluoride*, IBILABS International Bio-Analytical Industries, Inc. Aug. 7, 2016; *Uranium Tetrafluoride*, Wikipedia Ref Journal of the American Chemical Society, 1969; *Hydrofluoric Acid Corrosion Study of High-Alloy Materials*, P. E. Osborne et al, ORNL, UT Battelle, LLC for DOE, August 2002; and "Inconel 600", Spec sheet FSA, Shanghai Fengqu Superalloy Co, Ltd. Mar. 13, 2019.

Additionally, incorporated by reference in their entirety are the following patent documents: GB 803258; GB 1171257; GB 2536857; JP 11231091; KR 20060035917A; KR 20090089091A; KR 2009010 109237A; KR 20090109238A; KR 20110034347A; US 2013/0266112A1; WO 2017/158335A1; US 2011/0286570A1; U.S. Pat. Nos. 9,767,926; 4,062,923; and 6,251,310. Further incorporated by reference in its entirety are the documents: "Economic Analysis on Direct Use of Spent Pressurized Water Reactor Fuel in CANDU Reactors—I: DUPIC Fuel Fabrication Cost, by Hangbox Choi, Won Li Ko, and Myung Seung Yang, Korea Atomic Energy Research Institute, *Nuclear Technology*, Vol. 134, May 2001; Proceedings of the 16th International Conference on Nuclear Engineering ICONE 16, 2006/2008 "Second Generation Experimental Equipment Design to Support Veloxidation Testing At INL"; World Journal of Nuclear Science and Technology, 2015 "Reduction Kinetics of Uranium Trioxide to Uranium Dioxide Using Hydrogen."

Briefly, FIGS. 1 and 7 illustrate an exemplary implementation of a system including one or more processes for thermal molten salt reactor (TMSR) fuel-salt preparation, and FIG. 8 illustrates another exemplary implementation of the present disclosure, namely, a system including one or more processes for fast molten salt reactor (FMSR) fuel-salt preparation.

Methods and Systems for Calciner Fluoride Fuel Salt Preparation ("Option A")

FIGS. 1 and 7 illustrate an exemplary implementation of a system, generally 100, according to one exemplary implementation of the present disclosure for calciner fluoride fuel salt preparation in the production of thermal molten salt reactor fuel salt. An externally heated and cooled calciner apparatus provides for a continuous process for converting spent fuel $UO_2$ pellets (which have been previously removed from the fuel cladding) at elevated temperatures to $UF_4$ crystals/powder using a rotating cylinder through which the pellets advance, and using a counter-flow of oxygen (via the center of an axial support tube of an integrated helical auger) for oxidizing, then reducing in a concurrent flow of hydrogen gas, then fluorinating in a concurrent flow of HF gas (the gasses being introduced via the central pipes contained in the axis of the calciner.) The calciner apparatus has sealing mechanisms at both ends to prevent any of the gases or particulates from entering the surrounding facility's atmosphere. The pellets are loaded through these sealing mechanisms at one end of the calciner apparatus, and the $UF_4$ continuously exits through such sealing mechanisms at the other end of the calciner apparatus.

In some aspects, for example, the system 100 process begins with spent fuel pellets being recovered from fuel rod cladding (not shown) and fed into a rotating calciner, generally, 106. In an exemplary implementation, two calciners, one for each of two lines, could be used. As shown in FIG. 1, an axial cross-section of a calciner 106 depicts the construction thereof and the gas flow therethrough, shown by arrows 112. The direction of process flow through the calciner, is from left to right as indicated by arrows, in the axial-cross section. Sealed entries and exits to and from the calciner prevent gases escaping outside the system, while allowing entry of spent fuel pellets and exit of fluoride salt. (See U.S. Pat. No. 7,824,640, to Pitts, incorporated herein in its entirety by reference). All gases used and recycled in the calciner will be filtered to exclude unwanted elements and particles from exiting with the product. (See U.S. Pat. No. 4,666,684, to Pitts, incorporated herein in its entirety by reference). Proceeding through the calciner 106, there are three process subdivisions designated by three radial cross-sections, or zones, generally 106A, 106B, and 106C, (FIG. 1) showing the particular gas flow of each section and desired product.

Excess gases leave the calciner 106 by negative pressure to external filters (not shown). The externally-heated calciner rotates slowly, heating pellets to approximately 500° C. for a period of time, which in one non-limiting example could be approximately 1 to 3 hours. Section 106A includes a fixed integral helical auger, the direction of rotation being indicated, as viewed in the direction of gas flow from right to left in FIG. 1.

Calciner 106 dimensions, in one non-limiting example, could be approximately 15 to 30 inches in outside diameter, and axial section A could be approximately 10 to 20 feet in length. Axial sections 106B and 106C, in one non-limiting example, could be approximately 5 to 10 feet in length each. Sensors, which in some non-limiting examples may be embedded or attached wireless micro-sensors, generally 114, are shown in the calciner casing 116 and serve to monitor process parameters such as temperatures, pressures, material and added constituents flow rates, radiation, gases, and/or other measurable process details.

One center conduit, or pipe, 118 extends the entire length of the calciner 106, which has a plug in the mid length of the pipe to prevent the mixing of the oxygen and hydrogen gasses. Oxygen (an oxidizing agent) enters at the left (as shown in FIG. 1), as pellets enter the calciner 106, and the oxygen exits from the pipe 118 into the calciner interior 120, starting the oxidation of pellets. Curved arrows 112 on the axial section 106A indicate oxygen flow from the pipe 118 to the calciner interior 120. Spent fuel pellets, generally 124, are indicated in section 106A at the helical auger 126 as are also mixing vanes 128. During this part of the process in calciner 106, $UO_2$ (uranium dioxide) spent fuel pellets are oxidized to various oxides of uranium, which causes the pellets to disintegrate because of expansion during oxidation. All other constituents of spent fuel are contained and oxidized in this section.

A smaller center pipe 130 enters from the right end of calciner 106 and does not penetrate the full length of the calciner, but instead terminates at the start of axial section B. A baffle 131 will be used to reduce the mixing of the oxidizing gas and the reducing gas, at the appropriate spot axially, in the calciner, but will still allow advancement of the product through the calciner. (See U.S. Pat. No. 3,969,477, incorporated herein in its entirety by reference). One non-limiting exemplary location of baffle 131 is shown in FIG. 1. Baffle 131 is between the oxygen flow and the hydrogen gas flow in the calciner 106. The center pipe 130 supplies hydrogen gas for the second part of the process that takes place in the calciner 106, as shown by curved arrows 112 indicating outflow into the calciner main volume. The hydrogen gas is a reducing agent and flows from the center pipe 130 into the calciner interior 120, in section 106B. During this part of the process, various oxides of uranium are reduced to $UO_2$, and the consistency of the spent fuel pellets has been changed from a generally pellet form to coarse powder, shown in section 106B at the helical auger 126 and mixing vanes 128. Virtually the only effluent is water vapor, which is condensed during filtration of the recirculating gasses. All other constituents of spent fuel are contained and reduced during this part of the process.

The final process converts $UO_2$ to $UF_4$ (uranium tetrafluoride). Hydrogen gas continues to flow through the smaller center pipe exiting into the calciner section 106B, as described previously; then, HF (hydrogen fluoride) gas enters into the larger annular pipe 118 at the right end of the calciner 106 as shown in FIG. 1, and exits into the main interior, or, body, 120 of the calciner 106 at the beginning of axial section 106C, with arrows 132 indicating direction of flow. During this part of the process, uranium and virtually all other constituents in the spent fuel, fission products, rare earths, and actinides are all substantially fluoridated. The resultant coarse powder product is shown in cross-section 106C at the helical auger and mixing vanes 128.

Design and construction of the calciner apparatus 106 may include any suitable manufacturing techniques, including without limitation, application of 3D printing in order to use heat and corrosion resistant materials to create a durable internal design of calciner 106.

Calciner 106 includes instruments and sensors for the measurement of pressure, temperature, gas concentration, gas flow, and material flow, which can be accomplished by many, perhaps hundreds, of wireless imbedded micro sensors 114, which are monitored in real-time by computer systems and artificial intelligence applications to maintain safety of operation and to provide continuous improvement of the process. The sensors 114 may be built into the calciner apparatus 106 during the 3D printing process.

The calciner apparatus 106 keeps radioactive particles contained to prevent contamination of the surrounding facility, and calciner apparatus 106 generally produces only relatively small volumes of condensed liquid waste water, which will require specialized disposal. Operation of calciner apparatus 106 is more easily automated for operation on a 24/7 basis and is potentially less-expensive to operate over its lifetime than other types of processing. The design of the process using calciner apparatus 106 is scalable for increased capacity, as well as lending itself to be standardized for replication, so that multiple units can be used for backup purposes and/or to increase facility capacity.

The conversion gases used in calciner apparatus 106 are carried by inert gases such as helium or argon, which are recycled. Water vapor generated during processing is condensed and removed from the process on a continuous basis. Gases exit the calciner apparatus 106 at each of the sealed ends to the filtering and replenishment equipment. The recirculated gases are filtered to remove elements not desired in the end product.

During the first stage of this process, as shown in section 106A of FIG. 1, the pellets 124 are exposed to a counter-flow of oxidizing gas, shown by arrow 125, such as oxygen, to covert the UO2 to various combinations of higher oxides of uranium, which increases the volume of the pellets up to 30%, potentially causing them to fracture. As shown in the section 106A, the motion of the rotating cylinder 138, integral helical auger 128 blades, with small shelves, or ledges, 140 to lift the pellets 124, provides friction between the pellets, and small impact forces experienced by the pellets hasten the oxidation process, which itself expands and fragments the pellets 124 further. This ultimately results in powdered oxides of uranium. The diameter of the calciner 106, in one exemplary implementation, could be in the range of approximately 15-30 inches.

The second stage 106B of the calciner 106 process is to the right of a closure 127 in conduit 118 (FIG. 1) and exposes the oxide powders of uranium to a flow of reducing gas such as hydrogen, converting the various uranium oxide powders to $UO_2$. FIG. 1 shows the designs of section 106B, helical auger 128, and the axial gas supply channel 130.

The third stage 106C of the calciner 106 process shown in section 106C exposes the $UO_2$ powder to fluoridizing gaseous HF, which produces $UF_4$ in a crystalline/powder form for use in lithium fluoride molten salt-based reactors, for example. Section 106C shows the auger 128 and central path of the HF gas. Such $H_2$ and HF gases then exit conduit 119 to filtering, which includes condensing and removing of the water vapor formed during the reduction and fluorination operations.

The $UF_4$ exits the process in a manner which prevents leaking of gases to the atmosphere. A mechanism will be provided to seal the end of the calciner, so that the gases generated will be contained, and the product will exit cooled and ready for the next operation. The product is sampled, tested, and certified for shipment. The $UF_4$ is automatically placed in containers, which are automatically sealed and cooled, and then stored for delivery to the customer. (In order to provide more uniform particle sizes than can perhaps be produced in the calciner 106, as the product exits the calciner 106, a subsequent milling operation for milling to powder to desired specifications may be used.) The third stage of the process shown in section 106C exposes the $UO_2$ powder to fluoridizing gaseous HF, which produces $UF_4$ in a crystalline/powder form for use in lithium fluoride salt-based reactors, for example. Section 106C shows the auger 128 and central path of the HF gas.

In an exemplary implementation of the present disclosure, a method is illustrated in FIG. 7 for producing fuel for a thermal molten salt reactor, the implementation of the method including:

a. providing fuel assemblies containing an array of fuel tubes are aligned horizontally on the rod puller disassembly table 270 (FIG. 9), and fuel pellets are removed from tubes;

b. processing the spent fuel pellets and fuel pieces into a fluoride salt by ultimate oxidation, reduction and fluorination of uranium and its associated fuel constituents; and c. filtering (including condensing and removing) the water vapor formed during the reduction and fluorination operations.

Another exemplary implementation of such method could include, if desired and as shown in FIG. 7, fluorinating the U235-enriched granular spent fuel salt or plutonium in a calciner rotary kiln or fluidized bed, and if additionally desired, enriching the granular spent fuel salt with U235.

In an exemplary implementation, because both the reduction of the oxides of uranium to uranium dioxide and the conversion of uranium dioxide to uranium tetrafluoride are exothermic, the calciner includes both external heating and cooling apparatus (not shown) over most of its length.

In an exemplary implementation, the temperature of conversion of uranium dioxide to uranium tetrafluoride in HF gas is to be maintained above 400 deg C. during and after the conversion is completed, to prevent the undesired formation of volatile uranium hexafluoride, which will occur if it is cooled below 400 deg C. in the presence of HF gas. Therefore, the uranium tetrafluoride must exit through the sealed end of the calciner above 400 deg C. and then cooled to ambient temperature. This requires a counter flow of argon in the exit sealing mechanism of the calciner as cooling proceeds. Toward this end, the sealing and transfer mechanism for the fuel product is to be configured with sufficient cooling capacity. The calciner is configured to reduce the likelihood of the oxygen and hydrogen used in processing from being too close together in the oxidation and reduction steps in the calciner. Although at least one baffle 131 is used, it may be desirable to use multiple baffles, with the introduction of positive pressure inert gasses such as argon, between them, to prevent the mixing of oxygen and hydrogen during the process. Such inert gas can be introduced into the calciner through a pipe (not shown) placed axially in the auger 126, extending from the entrance end of the calciner to the baffle area.

In exemplary implementation, Option A may include, if desired, the spent nuclear fuel being generally permanently stored, then processed into spent fuel salt, and the spent fuel salt used in a thermal molten salt reactor, all on a single site having a secured perimeter.

Non-limiting example approximate temperatures, times, gas concentrations, materials used to construct the apparatus, and other parameters which are expected to be used are shown in the drawings.

Methods and Systems for Chloride Fuel Salt Preparation ("Option B")

FIGS. 2-7 and 9 illustrate an exemplary implementation of a system, generally 200, or portions thereof, according to one example of the present disclosure for chloride fuel salt preparation in the production of fast molten salt reactor fuel salt.

The process 200 begins after the spent fuel pellets 124 recovered from cladding in a manner as discussed above, being fed into a ball mill 202 (FIG. 9), and pulverized to a granular form. Gases are recovered from the initial disassembly, from the ball mill 202, and from one or more enclosed conveyors (not shown), routing granulated spent fuel to the (FIG. 2) oxide reduction tanks 210. The oxide reduction tanks are the first tanks in line of the process 200 to treat granular/pulverized spent nuclear fuel. Spent fuel is reduced using a strong reducing agent, preferably a chloride-containing reducing agent, such as anhydrous hydrogen chloride (AHCl) addition through a tank sparger 212 at the bottom of the tank 210. A small excess of chloride with molten chloride fuel salt ensures enough free chloride to produce chloride salt fuel. The process produces water vapor and hydrogen which are continuously removed by blower extraction and condensation, and. Glow plugs (not shown) ensure hydrogen gas is burned to water product. This process completes the goal of removing oxygen from all oxides in the salt fuel. Automated and dip sampling configuration, and density probes, while provided, are not shown. Gases are collected into a fluidized bed (not shown) for chlorination and recycling back into the main process. Raw granulated spent fuel is routed from the ball mills 202 by the enclosed conveyor to parallel oxide reduction tanks 210 containing molten salt. Granulated spent fuel is conveyed in a closed system, to the oxide reduction tank hopper 216.

A tank 220 containing molten chloride salt maintained, in one non-limiting example, at approximately (30-50) degrees C. (80-120 degrees F.) above the melting point of the halide salt (molten alkali or alkali earth chloride) melting point estimated to be 500 C (930 F). The melting point of the molten salt is variable with the amount and consistency of alkali and alkali-earth chlorides, and with the amount of spent fuel added to the mix. Nominal density of spent fuel salt chloride is expected to be 3.0 g/cc, depending on concentration (mol %). It is anticipated salt fuel for the fast molten salt reactor will require significant enrichment. This enrichment will be performed with addition of U235, Pu239, or MOX fuel. At an estimated beginning 30 mol % uranium chloride and plutonium-chloride, the balance being fission product chlorides and actinide chlorides (5-10) mol %, the remaining mix contains free molten salt at (60-65) mole %.

FIG. 3 shows the fuel salt mixing and adjustment tank 220, second in line of an exemplary implementation of the process, receives fuel salt in a hopper 221 from the oxide reduction tank 210. Both tanks 210, 220 (FIGS. 2 and 3) have automated sampling, and pump recirculation distribution headers (not shown) internal to the tanks. Tanks 210, 220 (FIG. 3) are sized and configured to prevent a criticality (critical-safe) in the tank as pulverized spent fuel is added and enriched with U235, Pu239, or MOX fuel, to high assay low enriched uranium (HA-LEU) at less than approximately 20% enrichment. Both tanks 210, 220 have the capability to receive salt, spent fuel, or enrichments; however, tank 220 will normally receive only salt replenishment as needed. The enrichment is necessitated in fueling and operation of a fast molten salt reactor. Tanks 210 and 220, in one non-limiting example, have approximate estimated dimensions of 10 feet in height by 16 feet front to back and 10 inches wide and is capable of processing approximately 1000 gallons. Tanks 220, in one exemplary implementation, are constructed integrally with an outside tank (not shown) having leak detection between the inside and outside tanks. Outside tank dimensions allow for insulation, multiple electric heater access points, recessed instrument enclosures, and accesses to each.

The tanks 210, 220 are instrumented with dip sample points (not shown) for automatic and/or manual sampling and analysis. This capability confirms independent on-line sampling that a receiving-mixing tank's contents are fully chlorinated to the extent possible (uranium, fission products, lanthanides, and actinides), i.e., substantially the entire inventory of spent nuclear fuel nuclides. A density probe 221 and manual liquid density measurement generated therefrom confirm whether the spent fuel salt density is at the expected density nominally (3.0-4.0) g/cm$^3$ (kg/m$^3$), molten alkali or alkali earth chloride density, no other content, is approximately (1.6 g/cm$^3$). The contents of the oxide reduction tank 210 (FIG. 2), and mixing and adjustment tank 220 will be processed further when sample analyses are confirmed. It is estimated reaction processing time is in an exemplary implementation 8 hours, including enrichment and sample confirmation, for the oxide reduction tank 210, and 4 hours for the mixing and adjustment tank 220. Full range gamma and neutron nuclear instruments, generally 224, provide continuous monitoring, trending, and alarming (counts/second) and rate of change. In one implementation, oxide reduction tank 210 size and configuration require four equally spaced instruments over the height and depth of each tank. A blower and chiller 226 combination removes water from tank 210. An anhydrous hydrogen chloride cylinder and compressor, generally 228, supply sparger arrangement 212. Salt mixers (e.g., screw-type mixers) 222 set at different depths, and front to back of the tank, ensure sufficient mixing of each tank. Additionally, FIG. 2 is an exemplary implementation wherein tank screw pump 218 is shown. Tank screw pump 218 is connected to tank 210 via conduit 210A, and an inlet valve 218A is provided proximate the inlet of pump, and an outlet valve 218B is provided proximate the outlet of pump 218. A conduit 218C connects valve 218B to a discharge valve 219 and to a tank pump recirculation isolation valve 229 connected to molten fuel salt mixing tank 220.

In an exemplary implementation shown in FIG. 3, a tank screw pump 218 is connected to tank 220 via conduit 220A, and an inlet valve 218A is provided proximate the inlet of pump, and an outlet valve 218B is provided proximate the outlet of pump 218. A conduit 218C connects valve 218B to a tank header valve 217 and to a tank pump recirculation isolation valve 225.

In FIG. 4, a representation of tanks 220 containing molten salt spent fuel are shown in a plan view in a side-by-side relationship, and, as in the case of all the drawings herein, are not shown to scale. This view represents the general size and configuration for both the oxide reduction tanks 210 (side by side) and mixing and adjustment tanks 220 (side by side). More specifically, FIG. 4 shows an implementation wherein six tanks 220 are shown. Accompanying apparatus and equipment and configurations used in connection with the tanks 220, are not shown.

In the basic process flow (FIG. 9), it could be considered that the first oxide reduction tank 210 would pump out to the first mixing and adjustment tank, the second oxide tank, the second mixing tank, and continue this sequence until all oxide reduction tanks have pumped out to their respective mixing and adjustment tank. The tanks, FIG. 4, also include the tank pump discharge header and nozzles, which are only located on the mixing and adjustment tank 220 pump out header. Spaced between tanks are encased boron slabs, or, dividers, or encasements, 230. Boron encasements 230 positioned between all fuel salt tanks 220 prevent nuclear criticality communication between the array of oxide reduction tanks in close proximity, and between the array of mixing and adjustment tanks in close proximity. Each group is considered herein as one subcritical assembly group, generally 266. Boron dividers 230 are backup defense in depth against possible criticality.

In an exemplary implementation, equipment is selected for durability and reliability. Two channels of electric "jacketed heaters" (not shown) are fitted to piping, valves and pumps ensure salt fuel in piping and equipment is of a high enough temperature to remain liquid and will flow. The heater channels are monitored, alarmed, and component failure identified if such a failure occurs. If sections of piping are allowed to cool where molten salt is solidified, heaters can be activated to re-melt the fuel salt. Instrumentation and automated functions are fully alarmed and continuously communicated to a control center. Diagnostic protocols help operators identify system interruptions or points requiring repair. All components on tanks and transfer piping are preferably accessible and capable of remote repair after steps are taken to isolate failed components from the system. Multiple independent receiving-mixing tanks and transfer equipment ensures a continuous supply of fuel salt in operation, including in the event of a system failure.

In an exemplary implementation, fuel salt preparation is begun with introduction of chloride salts of alkali metals or alkaline earth metals (e.g., NaCl, KCl, $MgCl_2$, $CaCl_2$), typically in crystalline form, and usually a mixture of two or more salts to a tank. Heaters (e.g., electrical heating elements) 231 are energized to melt the salt to molten state and maintain temperature well above melting point. Pulverized-granulated spent nuclear fuel is taken from the ball mill 202 and carried by enclosed conveyor to the tank hopper 223 and deposited via hopper isolation valve 227 into the oxide reduction tank, and open isolation valve 227 (FIG. 2). Spent fuel addition, regulated by limiting size and speed of the enclosed conveyor, ensures tank temperature is maintained within predetermined specifications and sufficient mixing and reaction of tank contents occurs. All mixers and the tank pump are turned on to initiate mixing, recirculation by pumping, and consistency of fuel salt in the tank and pump discharge lines. In an exemplary implementation, tank size and screw pump capacity are regulated to allow 4-6 hours for mixing and sampling, density recording and analysis before a tank is ready to be discharged.

FIGS. 5 and 6 show an exemplary implementation in plan and elevational views of a molten fuel salt collection tray, generally 240, consisting of the tray cover 254, fuel salt collection molds 256 atop heating and cooling elements 242, in a generally checkerboard pattern of heating elements 234A and cooling elements 234B. Insulation between elements along the sides and bottom of the tray prevents solidification during pouring and minimizes cooling time after solidification. More specifically, FIG. 5 is a plan view of salt mold cooling tray 240 with the tray cover and cooling molds removed.

In an exemplary implementation, salt mold cooling trays 240 (FIG. 9) are positioned and held in a stacked array of 8-10 trays, with spacing between the trays being sufficient to allow for removal of the cooling molds and cover as one assembly. Stacked arrays are tracked together by a revolving drive (not shown) which moves one stacked and cooled array group, to the ball mill feed table 250. At the table 250, the one-piece molds of each tray, in a particular group, are removed and upended or overturned to deposit solid "bars" of fuel salt. Each tray's mold is removed and returned to its position before the next mold is removed. After an entire array group has been emptied, it is returned in turn to be refilled with molten salt. Tray molds can be a non-stick surface, with salt fuel contraction during cooling, thereby facilitating solid salt fuel removal. The metal molds may be connected side-to-side and laterally supported to ensure tray strength and versatility. Solid salt "bars" are gathered to the side of the turning table and are generally organized lengthwise on a moving conveyor and fed into 2-3 coarse ball mills 202A (FIG. 9). Product fuel salt from the ball mill is further conveyed to a fine mill, such as a Fitzmill 252 for sizing, sampling, certification, and packaging for protection against environmental conditions. More specifically, FIG. 6 illustrates a salt mold cooling tray front view, including top cover 254, cooling molds 256, heating and cooling elements 234A, 234B, which, in one implementation, could be coils.

In an alternate implementation, molten salt fuel may be stored as a contiguous solid in canisters and subcritical arrays. This process involves preparation of chloride fuel salt in the aforementioned receiving and mixing tanks 220, sampling and certification of tanks, and transfer by screw pump to a "critical safe" steel canister (not shown), set aside for cooling. Canisters are transported and stored, in "critical safe" arrays. Facilities using "solid salt" canisters are equipped to remotely handle and inductively heat each canister to form liquid fuel salt for addition to their molten salt reactors.

In FIG. 4, molten salt spent fuel receiving and mixing tanks 220 are shown in a side-by-side representative top view, but not to scale. More specifically, FIG. 4 shows an implementation wherein six receiving-mixing tanks 220 are side-by-side, including a tank pump discharge header, generally 260, and encased boron encasements 230 (sized for inner tank side dimension area). Boron encasements 230 provide structural stability and protection from damage and are positioned between fuel salt tanks 220 to prevent nuclear criticality communication between tanks in a given array of tanks in close proximity, such array being considered herein as one subcritical assembly group, generally 266. Boron dividers 230 are backup defense, in depth, against possible criticality.

As shown in an exemplary implementation in FIG. 2, the oxide reduction tank is the first tank in the process, wherein a system and process are illustrated which reduces uranium and plutonium oxides to chlorides. After this process, the contents of the reduction tank 210 are pumped over to the mixing and adjustment tank. In one implementation, an isolation valve is provided on the loading hopper. In an exemplary implementation wherein only chloride salts are desired, the salts are prepared in the oxide reduction tank, and, then pulverized, granulated spent fuel is added to the oxide reduction tank, the temperature increase is noted, and oxide reduction is begun by the sparging action of anhydrous hydrogen chloride. After an allowance of time necessary for mixing and water and hydrogen gas removal, toward complete reduction, the contents are pumped to the mixing and adjustment tank for final analysis, certification, and then pumped over to cooling trays. The teaching of the present disclosure includes reducing all oxides, removing oxygen entirely and preventing production of other oxides, ensures an authentic chloride salt fuel, when oxygen is removed from the fuel salt. The result is that substantially the only byproduct from this implementation of the present disclosure is water, which is collected for sampling and released.

In an exemplary implementation of the present disclosure, a method is illustrated in FIG. 8 for producing fuel for a fast molten salt reactor, the implementation of the method including:

a. providing fuel assemblies, removing fuel pellets containing uranium and all spent fuel constituents, from the fuel assemblies;

b. granulating the fuel pellets in a semi-voided atmosphere using a ball mill, roller mill, or chopping mill, for process feed to the chlorination process;

c. processing the granular spent fuel salt into chloride salt by ultimate reduction and chlorination of the uranium and associated fuel constituents chloride salt solution, by anhydrous hydrogen chloride (AHCl);

d. enriching the granular spent fuel salt with U235, Pu239, or MOX;

e. chlorinating the enriched granular spent fuel salt to yield molten chloride salt fuel using AHCl halide salt reduction;

f. analyzing, adjusting, and certifying the molten chloride salt fuel for end use in a molten salt reactor;

g. pumping the molten chloride salt fuel to stacked arrays of cooling trays or canisters and cooling the molten chloride salt fuel to yield solid salt fuel bars, sticks, or canister solid form; and h. milling the solidified molten chloride salt fuel to predetermined specifications for the fast molten salt reactor.

In exemplary implementations, Option B may include, if desired, the spent nuclear fuel being generally permanently stored, then processed into spent fuel salt, and the spent fuel salt used in a fast molten salt reactor, all on a single site having a secured perimeter.

Non-limiting example approximate temperatures, times, gas concentrations, materials used to construct the apparatus, and other parameters which are expected to be used are shown in the drawings.

FIG. 10 schematically illustrates a site on which components of a system 1000 according to an example implementation of the present disclosure may be located. The system 1000 may include a site 1002 within a secured perimeter 1004, and a limited-access facility 1006 on the site 1002. As described above, the system 1000 may include a number of components 1008, and at least some of these components 1008 of the system 1000 may be located within the limited-access facility 1006. The system 1000 may also include a spent nuclear fuel storage facility 1010 located on the site, and a molten salt reactor 1012 located on the site 1002.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method of processing spent nuclear fuel into fast molten salt reactor fuel, the method comprising:
    providing fuel assemblies having spent fuel;
    removing the spent fuel from the fuel assemblies;
    granulating the removed spent fuel for process feed to a chlorination process;
    processing the granular spent fuel into chloride salt by ultimate reduction and chlorination, including reacting the granular spent fuel with anhydrous hydrogen chloride (AHCl);
    enriching the granular spent fuel salt;
    chlorinating the enriched granular spent fuel salt to yield molten chloride fuel salt;
    analyzing, adjusting, and certifying the molten chloride fuel salt for end use in a molten salt reactor;
    pumping the molten chloride fuel salt and cooling the molten chloride fuel salt; and
    milling the solidified molten chloride fuel salt to predetermined specifications.

2. The method of claim 1, wherein the granulating step occurs in a semi-voided atmosphere using one or more of a ball mill, roller mill, or chopping mill.

3. The method of claim 1, wherein the granular spent fuel salt is enriched with one or more of uranium-235 (U235), plutonium-239 (Pu239), or mixed oxide (MOX).

4. The method of claim 1, wherein the chlorinating step occurs by reacting the enriched granular spent fuel salt with AHCl.

5. The method of claim 1, wherein the molten chloride fuel salt is pumped to stacked arrays of cooling trays or individual storage canisters.

6. The method of claim 1, wherein the molten chloride fuel salt is cooled to yield one or more of solid fuel salt bars, sticks, or canister solid forms.

7. The method of claim 1, wherein the milling step occurs via one or more of a ball mill, roller mill, or chopping mill.

8. The method of claim 1, wherein the fuel assemblies contain an array of fuel tubes aligned horizontally on a rod puller disassembly table.

9. The method of claim 1, wherein the fuel assemblies contain an array of fuel tubes and the spent fuel is removed by laser slitting of the fuel tubes, opening the tubes, and removing the spent fuel.

10. The method of claim 1, further comprising collecting dust and gases and recycling the dust and gasses.

11. The method of claim 1, wherein the enriching step occurs in an oxide reduction tank.

12. The method of claim 1, wherein the enriching step comprises low enriched uranium including high assay-low enriched uranium.

13. The method of claim 1, wherein the chlorinating step occurs by immersion in a molten chloride salt bath.

14. The method of claim 1, wherein spent fuel gases are collected by a fluidized bed and converted to chlorinated fuel salts.

15. The method of claim 5, wherein the pumping step comprises pumping the molten chloride fuel salt into stacked arrays of cooling trays, wherein the cooling trays are cooled by chilled water, and wherein the cooling trays are configured with multiple parallel and separate rows, each surrounded by cooling coils.

16. The method of claim 5, wherein the pumping step comprises pumping the molten chloride fuel salt into individual storage canisters, and wherein the individual storage canisters are inductively heated to liquid.

17. A method of processing spent nuclear fuel into fast molten salt reactor fuel, the method comprising:
    providing fuel assemblies having spent fuel containing uranium;
    removing the spent fuel from the fuel assemblies;
    granulating the removed spent fuel in a semi-voided atmosphere using a ball mill, roller mill, or chopping mill, for process feed to a chlorination process;
    processing the granular spent fuel into chloride salt by ultimate reduction and chlorination of the uranium by anhydrous hydrogen chloride (AHCl);
    enriching the granular spent fuel salt with uranium-235 (U235), plutonium-239 (Pu239), or mixed oxide (MOX);
    chlorinating the enriched granular spent fuel salt to yield molten chloride fuel salt using AHCl halide salt reduction;
    analyzing, adjusting, and certifying the molten chloride fuel salt for end use in a molten salt reactor;
    pumping the molten chloride fuel salt to stacked arrays of cooling trays or canisters and cooling the molten chloride fuel salt to yield solid fuel salt bars, sticks, or canister solid forms; and
    milling the solidified molten chloride fuel salt to predetermined specifications for the fast molten salt reactor.

18. A method of processing spent nuclear fuel into fast molten salt reactor fuel, the method comprising:
    providing fuel assemblies having spent fuel;
    removing the spent fuel from the fuel assemblies;
    granulating the removed spent fuel for process feed to a chlorination process;
    processing the granular spent fuel into chloride salt by ultimate reduction and chlorination, including reacting the granular spent fuel with anhydrous hydrogen chloride (AHCl);
    enriching the granular spent fuel salt;
    chlorinating the enriched granular spent fuel salt to yield molten chloride fuel salt by reacting the enriched granular spent fuel salt with AHCl;
    analyzing, adjusting, and certifying the molten chloride fuel salt for end use in a molten salt reactor;
    pumping the molten chloride fuel salt and cooling the molten chloride fuel salt; and
    milling the solidified molten chloride fuel salt to predetermined specifications.

19. The method of claim 18, wherein the fuel assemblies contain an array of fuel tubes and the spent fuel is removed by laser slitting of the fuel tubes, opening the tubes, and removing the spent fuel.

20. The method of claim 18, wherein the enriching step occurs in an oxide reduction tank.

21. The method of claim 18, wherein the chlorinating step occurs by immersion in a molten chloride salt bath.

22. The method of claim 18, wherein spent fuel gases are collected by a fluidized bed and converted to chlorinated fuel salts.

* * * * *